(12) United States Patent
Takacs et al.

(10) Patent No.: US 10,754,664 B2
(45) Date of Patent: Aug. 25, 2020

(54) ILLUMINATION PRODUCT RECONFIGURATION

(71) Applicant: Energy Focus, Inc., Solon, OH (US)

(72) Inventors: Laszlo Takacs, San Mateo, CA (US); Dmitri Dmitrievich Kourennyi, Shaker Heights, OH (US)

(73) Assignee: ENERGY FOCUS, INC., Solon, OH (US)

( * ) Notice: Subject to any disclaimer, the term of this patent is extended or adjusted under 35 U.S.C. 154(b) by 177 days.

(21) Appl. No.: 15/980,459

(22) Filed: May 15, 2018

(65) Prior Publication Data

US 2019/0354381 A1 Nov. 21, 2019

(51) Int. Cl.
| | | |
|---|---|---|
| G06F 9/44 | (2018.01) | |
| G06F 9/445 | (2018.01) | |
| F21V 23/00 | (2015.01) | |
| G06F 8/65 | (2018.01) | |
| F21Y 115/10 | (2016.01) | |

(52) U.S. Cl.
CPC ........ G06F 9/44505 (2013.01); F21V 23/003 (2013.01); G06F 8/65 (2013.01); *F21Y 2115/10* (2016.08)

(58) Field of Classification Search
CPC .............................. G06F 9/44505; H05B 37/02
See application file for complete search history.

(56) References Cited

U.S. PATENT DOCUMENTS

2015/0342011 A1* 11/2015 Brochu ................ G05B 19/124
                                                                  315/294
2017/0018256 A1* 1/2017 Rains, Jr. ........... H05B 37/0218
2017/0079117 A1* 3/2017 Jayawardena ..... H05B 37/0227
2017/0094753 A1* 3/2017 Lunn .................. H05B 37/0227

OTHER PUBLICATIONS

Wikipedia "File Transfer Protocol"; https://en.wikipedia.org/wiki/File_Transfer_Protocol; May 15, 2018, 10 pages.
Wikipedia "Media Transfer Protocol"; https://en.wikipedia.org/wiki/Media_Transfer_Protocol; May 15, 2018, 7 pages.
pctechguide.com—"File Systems (FAT, FAT8, FAT16, FAT32 and NTFS) explained", https://www.pctechguide.com/hard-disks/file-systems-fat-fat8-fat16-fat32-and-ntfs-explained, May 15, 2018, 5 pages.

* cited by examiner

*Primary Examiner* — Albert Wang
(74) *Attorney, Agent, or Firm* — Rankin, Hill & Clark LLP

(57) ABSTRACT

Systems and methods for reconfiguration of illumination products are presented. An illumination product comprises components that implement a device access framework to facilitate access to the configuration of the illumination product by external components. Components internal to or otherwise associated with the illumination product codify various configuration parameters associated with the illumination product in one or more files (e.g., text files) and/or file attributes (e.g., filenames). One or more external components coupled to the internal components use a file access API to read from, write to, and/or otherwise manipulate the files (e.g., modify file content and/or file attributes) so as to access and/or affect the configuration parameters. Changes to the configuration parameters invoked by the external components are detected by the internal components and applied to the configuration (e.g., operational settings) of the illumination product.

20 Claims, 9 Drawing Sheets

ILLUMINATION PRODUCT RECONFIGURATION

FIELD

This disclosure relates to illumination products, and more particularly to techniques for illumination product reconfiguration.

BACKGROUND

The convergence of modern networking, communications, computing, semiconductor, and/or other technologies has enabled what is known as the "Internet of Things" (IoT). The devices or "things" in an IoT environment can be characterized by their ability to communicate with one another and/or with other systems to exchange data and/or to carry out other operations at the device and/or in the environment. One class of such devices includes "smart" lighting products for home or commercial use. For example, a smart lighting product (e.g., lamp) might have various embedded components that facilitate communication and control of certain operating characteristics of the lighting product. For example, the on/off state or brightness of lamps might be controlled wirelessly from a smart phone. In this case, the embedded components that facilitate such functionality might comprise a wireless transceiver, a microcontroller with embedded software, one or more sensors, and/or other components. The embedded components are often low-cost components with limited breadth of functionality so as to achieve a product cost that is acceptable to the market.

Unfortunately, embedded components can become functionally obsolete long before the underlying functionality of the product (e.g., lighting capability of a lamp) has reached its end of life. This can lead to undesired expenses due to replacement costs involving material and labor. For example, the wireless transceiver of a smart lamp might be designed to accommodate a certain frequency band of a certain communications standard (e.g., 2.4 GHz for ZigBee) when first implemented in a particular operating environment. If a different communications standard with a different frequency band (e.g., 800-900 MHz for Z-Wave) is to be implemented in the environment, the lamp will be incompatible with that environment. Furthermore, the embedded software (e.g., firmware) of the microcontroller in the smart lamp might need to be modified to accommodate the new communications standard and/or to accommodate other changes to the operating environment (e.g., at higher layers in the open systems communication (OSI) model). However, no mechanism exists for changing the firmware of the microcontroller that is embedded in the lamp.

What is needed is a low-cost way to modify the interfacing functionalities of an illumination product so as to accommodate certain changes that may occur in its operating environment.

SUMMARY

The present disclosure describes techniques used in systems, methods, and in computer program products for illumination product reconfiguration, which techniques advance the relevant technologies to address technological issues with legacy approaches. More specifically, the present disclosure describes techniques used in systems, methods, and in computer program products for low-cost reconfiguration of illumination products. Certain embodiments are directed to technological solutions for implementing a device access framework that presents a file access API to facilitate access by external components to an illumination product's configuration.

The disclosed embodiments modify and improve over legacy approaches. In particular, the herein-disclosed techniques provide technical solutions that address the technical problems attendant to cyclical obsolescence of illumination products as changes occur in their operating environments. Such technical solutions relate to improvements in computer functionality. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of smart devices, IoT devices, and smart appliances as well as advances in various technical fields related to low-cost field programmability.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
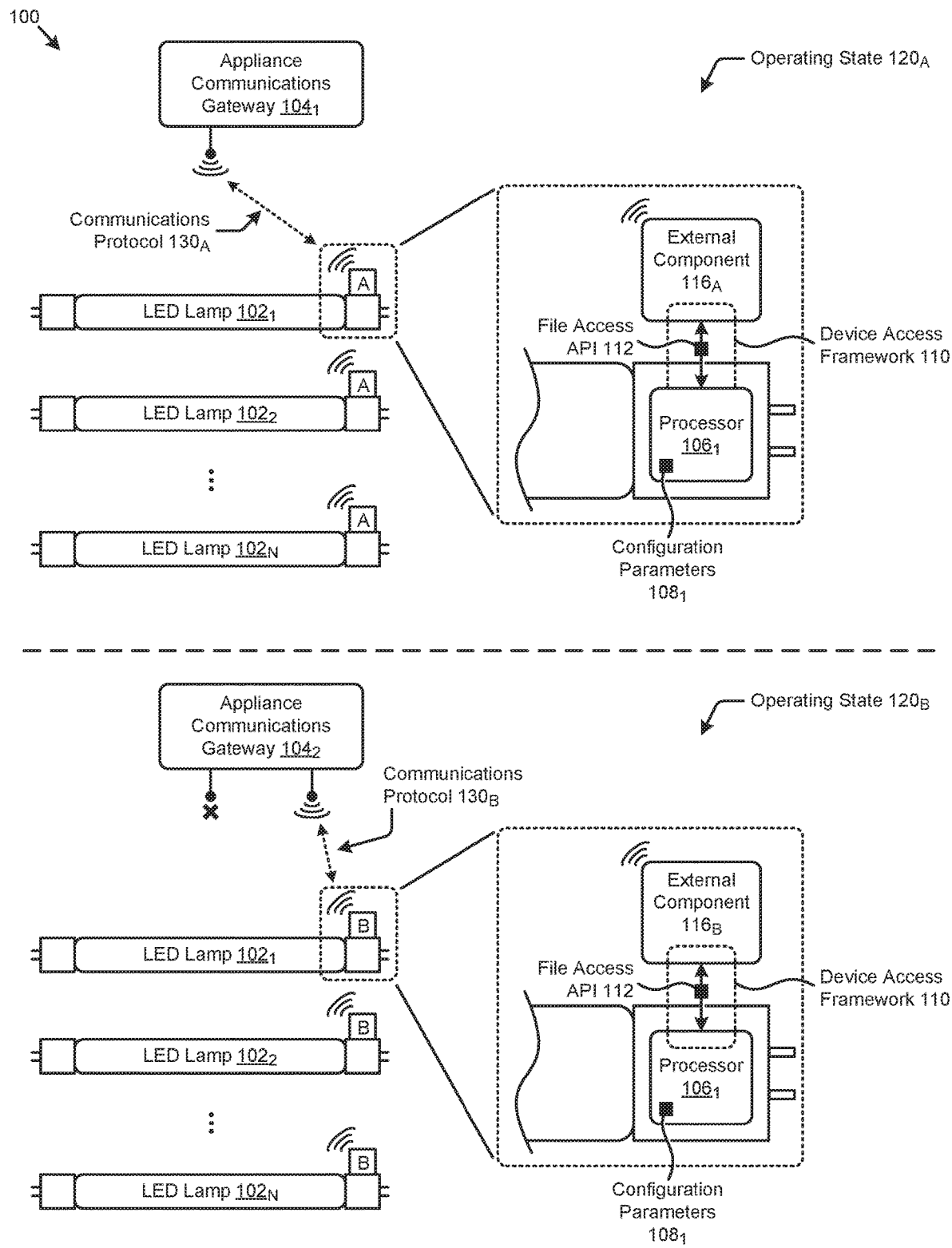
FIG. 1 illustrates an operating environment in which embodiments of the present disclosure can be implemented.

Embodiments in accordance with the present disclosure address the problem of obsolescence of illumination products as changes occur in their operating environments. Some embodiments are directed to approaches for implementing a device access framework that presents a file access API for access to an illumination product's configuration by external components. The accompanying figures and discussions herein present example environments, systems, methods, and computer program products for low-cost reconfiguration of illumination products.

Overview

Disclosed herein are techniques for implementing a device access framework that presents a file access API for access to an illumination product's configuration by external components. The operation of components that are internal to or otherwise associated with the illumination product can be manipulated to accommodate changes in the operating environment of the illumination product. As an example, if the operating environment of an illumination product (e.g., fluorescent lamp) changes from using a ZigBee communications technology to a Z-Wave communications technology, one or more external components interfacing with the illumination product using the device access framework can be changed such that the illumination product's support for ZigBee can be augmented to add support for Z-Wave, thereby accommodating the change to the environment without, for example, replacing the illumination product (e.g., fluorescent lamp).

In certain embodiments, all or portions of the device access framework are implemented using a low-cost processor (e.g., 8-bit microcontroller) situated within the housing of the illumination product. The processor is configured to codify various configuration parameters associated with the illumination product in one or more files (e.g., text files) and/or file attributes (e.g., filename). In certain embodiments, the files are organized according to a file system (e.g., FAT16) and appears as files on a 'drive' (e.g., a hard disk drive) when presented to the external components. The external components can read from, write to, and/or otherwise manipulate the files (e.g., modify file content and/or file attributes) to communicate with the illumination product (e.g., modify a configuration parameter).

In certain embodiments, one or more of the external components are interconnected with the processor by a physical connector (e.g., USB connector). In certain embodiments, one or more of the configuration parameters are derived from sensor readings. In certain embodiments, two or more of the external components are physically connected to one another. In certain embodiments, the firmware of one or more of the external components is updated. In certain embodiments, the firmware of components internal to the illumination product is updated.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates an operating environment 100 in which embodiments of the present disclosure can be implemented. As an option, one or more variations of operating environment 100 or any aspect thereof may be implemented in the context of the architecture and functionality of the embodiments described herein.

FIG. 1 illustrates one aspect pertaining to implementing a device access framework that presents a file access API for access to an illumination product's configuration by external components. The figure is presented to illustrate how the herein disclosed techniques can be applied to a set of illumination products (e.g., LED lamps) so as to facilitate adapting the illumination products to changing operating environments.

As shown. FIG. 1 illustrates a first operating state (e.g., operating state $120_A$) of operating environment 100 in which a plurality of "smart" LED tube lamps (e.g., LED lamp $102_1$, LED lamp $102_2$, . . . , LED lamp $102_N$) are accessed by an appliance communications gateway $104_1$. For example, appliance communications gateway $104_1$ might communicate with any of the LED lamps to control their on/off state, brightness, and/or other operating characteristics. As depicted in operating state $120_A$, appliance communications gateway $104_1$ communicates wirelessly with the LED lamps using a communications protocol $130_A$. For example, communications protocol $130_A$ might correspond to the ZigBee protocol.

The herein disclosed techniques are applied to facilitate such communication with smart devices or appliances (e.g., LED lamps) while also addressing the need to adapt such devices or appliances to changes in their operating environments. As can be observed in the exploded view of LED lamp $102_1$ in operating state $120_A$, a device access framework 110 is implemented to facilitate access to certain instances of configuration parameters $108_1$ associated with LED lamp $102_1$ by one or more electronic components externally coupled to the lamp (e.g., external component $116_A$) through a file access API 112.

As can be observed, the file access API 112 is implemented at least in part by a processor $106_1$ situated in LED lamp $102_1$ (e.g., in its housing). The processor $106_1$ codifies the configuration parameters $108_1$ into one or more files (e.g., text files) and/or file attributes (e.g., filename). In certain embodiments, the files are organized according to a file system (e.g., FAT16) and presented as such to any external components coupled to processor $106_1$. The external components can thereby use widely-known file system access programming instructions to read from, write to, and/or otherwise manipulate the files (e.g., modify file content and/or file attributes) to communicate with the LED lamp $102_1$ (e.g., modify a configuration parameter). In operating state $120_A$, for example, external component $116_A$ might be a wireless computing system that can communicate with appliance communications gateway $104_1$ using communications protocol $130_A$. In this case, appliance communications gateway $104_1$ can manage (e.g., read, update, etc.) the configuration parameters $108_1$ of LED lamp $102_1$ that are accessed by external component $116_A$ through the file access API 112 so as to manage the operation of LED lamp $102_1$.

The techniques disclosed herein further accommodate certain changes to the operating environment 100 comprising the plurality of LED lamps. Specifically, a second operating state (e.g., operating state $120_B$) of operating environment 100 might comprise a modified instance of appliance communications gateway $104_2$. As can be observed, appliance communications gateway $104_2$ no longer uses communications protocol $130_A$ but instead uses a communications protocol $130_B$ to communicate with smart appliances in operating environment 100. As an example, communications protocol $130_B$ might correspond to the Z-Wave protocol. Rather than remove and replace the plurality of LED lamps (e.g., which may have many hours of remaining useful life) to accommodate such a change, the herein disclosed techniques can accommodate the change by merely substituting the external components coupled to the LED lamps. In some implementations of the herein disclosed techniques, a change in the operating environment might be accommodated by an update of the processor firmware that is facilitated (e.g., received wirelessly) by an external component.

For example, as shown for LED lamp $102_1$, external component $116_A$ in operating state $120_A$ is replaced with external component $116_B$ when in operating state $120_B$. As such, external component $116_B$ facilitates communication with appliance communications gateway $104_2$ using communications protocol $130_B$. As can be further observed, no changes to other elements (e.g., processor $106_1$, configuration parameters $108_1$, device access framework 110, file access API 112, etc.) associated with LED lamp $102_1$ are required. In some cases, if a low-power interconnect mechanism (e.g., USB connector) is used to couple the external components to the processors, the external components can be swapped out without powering down the corresponding device or appliance (e.g., LED lamp).

One embodiment of techniques for illumination product access as facilitated by the techniques described herein is disclosed in further detail as follows.

Figure 2:
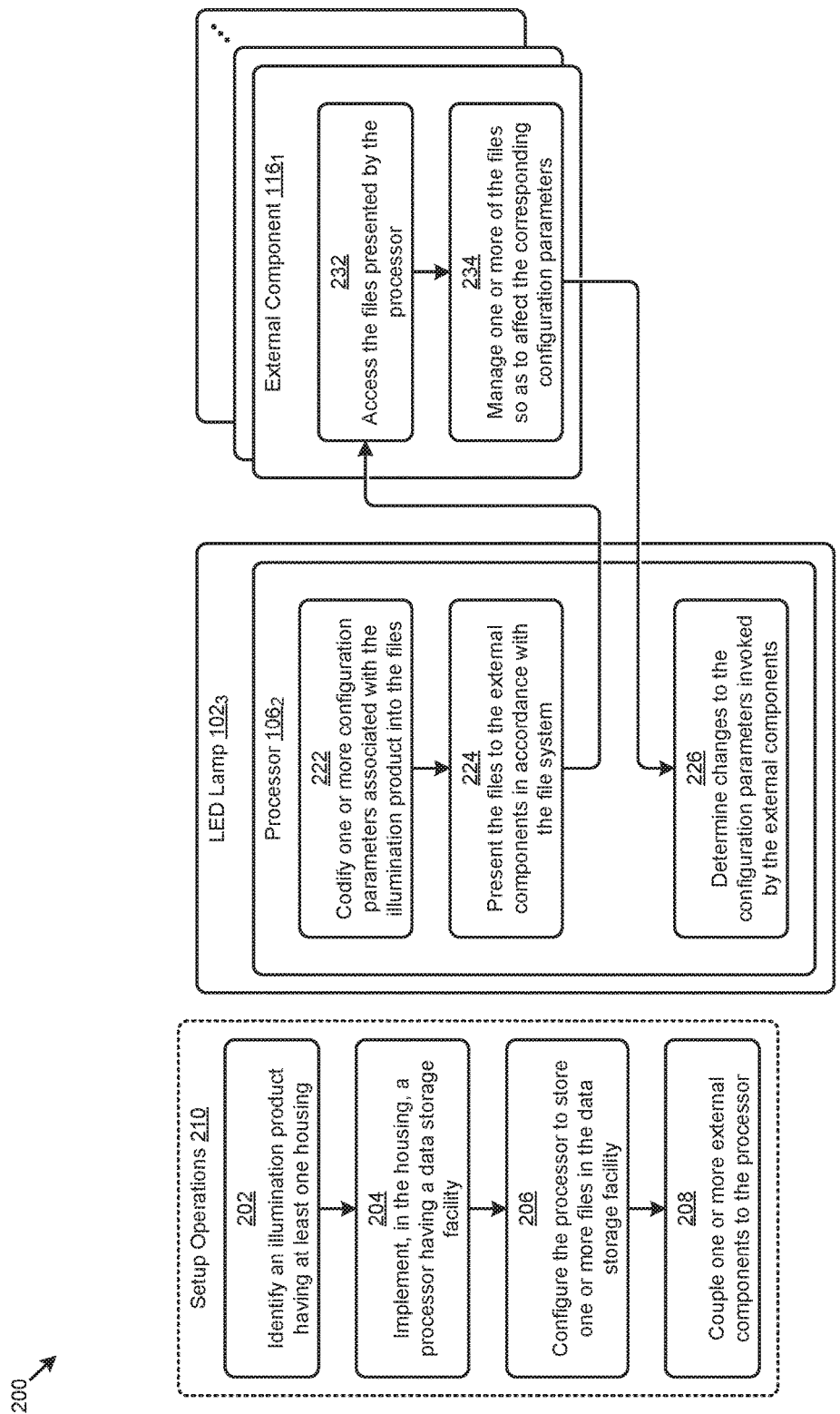
FIG. 2 depicts an illumination product access technique as implemented in systems that facilitate low-cost reconfiguration of an illumination product, according to an embodiment.

FIG. 2 depicts an illumination product access technique 200 as implemented in systems that facilitate low-cost reconfiguration of an illumination product. As an option, one or more variations of illumination product access technique 200 or any aspect thereof may be implemented in the context of the architecture and functionality of the embodiments described herein. The illumination product access technique 200 or any aspect thereof may be implemented in any environment.

FIG. 2 illustrates one aspect pertaining to implementing a device access framework that presents a file access API for access to an illumination product's configuration by external components. The figure presents one embodiment of certain steps and/or operations that can be performed to setup and use the file access API to manage certain configuration parameters associated with an illumination product. As shown, at least a first portion of the steps and/or operations might be performed at a processor $106_2$ situated in an LED lamp $102_3$, and at least a second portion of the steps and/or operations might be performed at one or more of a plurality of external components (e.g., external component $116_1$) associated with LED lamp $102_3$. Other steps and/or operations might be characterized as a set of setup operations 210.

As shown, the setup operations 210 of illumination product access technique 200 can commence by identifying an illumination product having at least one housing (step 202). The illumination product might be an LED tube lamp (e.g., LED lamp $102_3$) as earlier described, or any other type of illumination product (e.g., MR16 lamp, PAR30 lamp, etc.). A processor (e.g., processor $106_2$) that has a data storage facility is implemented in the housing (step 204). For example, the processor might be an 8-bit microcontroller that is characterized as having a relatively low cost and limited breadth of functionality so as to achieve an illumination product cost that is acceptable to the market. The processor is configured to store one or more files at the data storage facility (step 206). As an example, the files stored in the data storage facility might be organized as files that are indexed in a file allocation table (e.g., FAT16 table, FAT32 table, etc.). One or more external components (e.g., external component $116_3$) are coupled to the processor (step 208). The coupling between the external components and the processor can comprise a communications connection, an electrical connection, a physical connection, and/or another type of connection and/or any combination thereof.

The illumination product access technique 200 further codifies one or more configuration parameters associated with the illumination product into one or more files stored in the data storage facility (step 222). The files are then presented to the external components in accordance with the file system (step 224). The presentation might merely comprise allocating at least a portion of the data storage facility to store the files in data structures (e.g., file allocation tables) compliant with the file system, and then provisioning access to that portion of the data storage facility to the external components. The external components (e.g., external component $116_3$) can then access the files presented by the processor (step 232).

For example, if processor $106_2$ organizes the foregoing files according to a FAT16 file system, then external component $116_3$ (and other external components) can be configured to be capable of traversing the FAT16 file system to access the files. In some cases, the external component $116_3$ might access the files using a communications protocol such as the media transfer protocol (MTP) or the file transfer protocol (FTP). The external components can manage one or more of the files so as to affect the corresponding configuration parameters codified in the files (step 234). As an example, the external components might invoke a modification to certain file content and/or file attributes (e.g., filename) associated with the files to modify one or more configuration parameters. Any changes to the configuration parameters invoked by the external components are determined at the processor (step 226). In some cases, such configuration parameter changes are used to manage the operational settings (e.g., on/off state, brightness level, etc.) of the illumination product.

One embodiment of a system for implementing the illumination product access technique 200 and/or other herein disclosed techniques is disclosed as follows.

Figure 3:
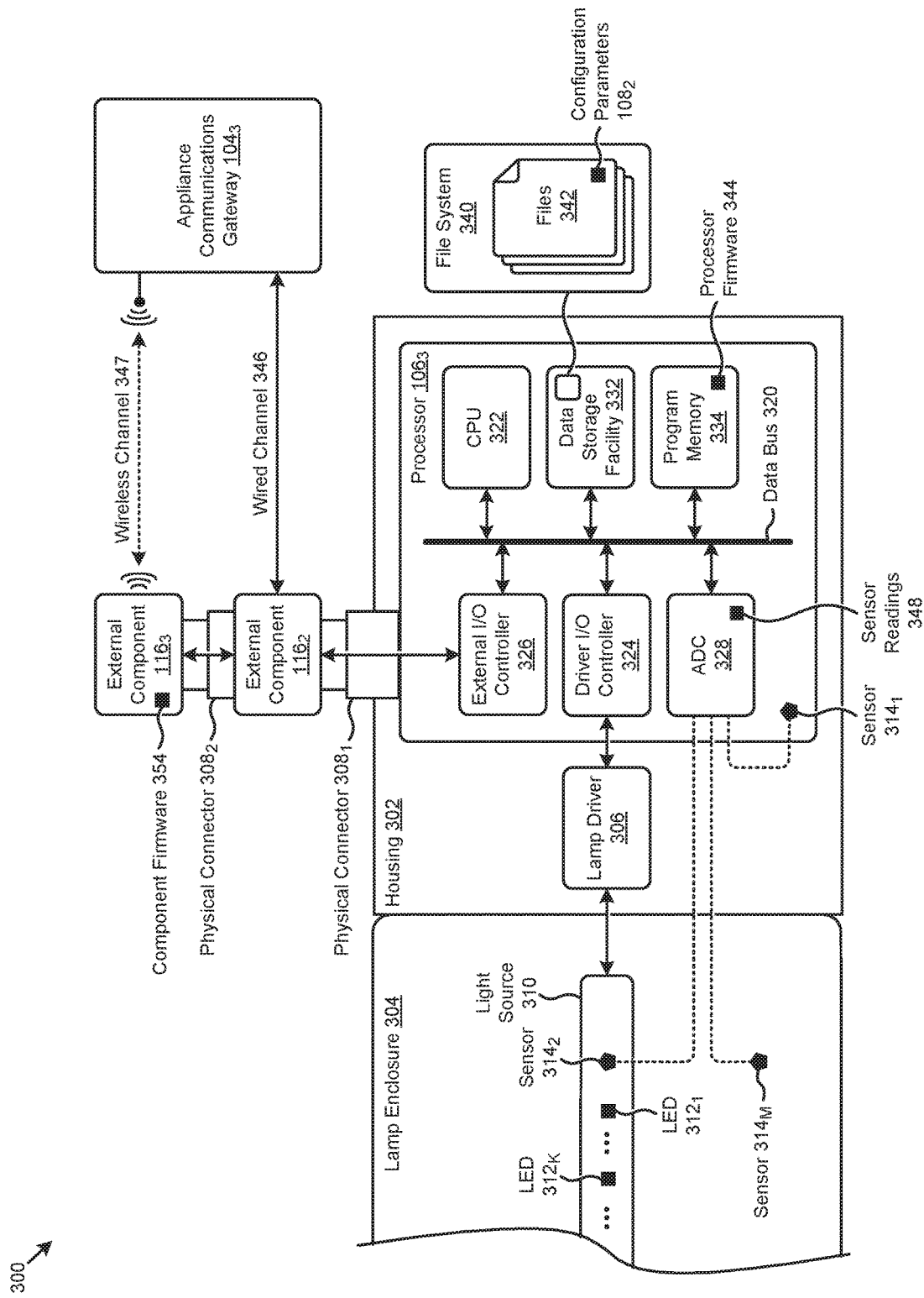
FIG. 3 is a block diagram of an illumination product in which embodiments of the present disclosure can be implemented.

FIG. 3 is a block diagram of an illumination product 300 in which embodiments of the present disclosure can be implemented. As an option, one or more variations of illumination product 300 or any aspect thereof may be implemented in the context of the architecture and functionality of the embodiments described herein. The illumination product 300 or any aspect thereof may be implemented in any environment.

FIG. 3 illustrates one aspect pertaining to implementing a device access framework that presents a file access API for access to an illumination product's configuration by external components. The figure is being presented to show one embodiment of the components and associated data structures and data flows of an illumination product in which an embodiment of the present disclosure is implemented. The components, data structures, and data flows shown in FIG. 3 present one partitioning and associated data manipulation approach. The specific example shown is purely exemplary, and other subsystems, data structures, data flows, and/or partitioning are reasonable.

As shown, the illumination product 300 comprises a housing 302, a light source 310, and a lamp enclosure 304 surrounding the light source 310. A processor $106_3$ is situated in the housing 302 and comprises a CPU 322, a data storage facility 332, a program memory 334, an external I/O controller 326, a driver I/O controller 324, an analog-to-digital converter (e.g., ADC 328), and/or other components that communicate with one another over a data bus 320. As an example, processor $106_3$ might an integrated circuit, such as an 8-bit microcontroller. The driver I/O controller 324 of processor $106_3$ is coupled to a lamp driver 306 that controls the light source 310. For example, lamp driver 306 might be an LED driver that controls a plurality of LEDs (e.g., LED $312_1, \ldots,$ LED $312_K, \ldots$) that constitute the light source 310.

According to the herein disclosed techniques, at least a portion of the data storage facility 332 (e.g., SRAM, etc.) can be allocated to store data in accordance with a file system 340, such as FAT16, FAT32, NTFS, and/or another file system. The file system 340 can store any number of files 342, such as text files. The content and/or attributes of the files 342 can be manipulated so as to codify one or more configuration parameters $108_2$ corresponding to the illumination product 300. In some embodiments, the program memory 334 (e.g., FLASH memory) might store an instance of processor firmware 344 that comprises programming instructions (e.g., conditional logic, mapping data structures, etc.) that facility codification of the configuration parameters $108_2$ in the files 342.

In some cases, one or more of the configuration parameters $108_2$ are derived from sensor readings 348 collected by ADC 328 from various sensors (e.g., sensor $314_1$, sensor $314_2, \ldots,$ sensor $314_M$) throughout the illumination product 300. One or more external components (e.g., external component $116_2$ and external component $116_3$) can interface with processor $106_3$ to access the configuration parameters $108_2$ according to the herein disclosed techniques. The external components might be physically and/or electronically coupled to processor $106_3$ by one or more physical connectors. As shown, for example, external component $116_2$ is coupled to the external I/O controller 326 of processor $106_3$ by a physical connector $308_1$ (e.g., USB connector) and external component $116_3$ is connected to external component $116_2$ by a physical connector $308_2$ (e.g., USB connector) to achieve access to processor $106_3$ through external component $116_2$. Such external components are electronic devices that are coupled to the illumination product 300 to carry out one or more functions. For example, external component $116_2$ and external component $116_3$ might be transceivers that facilitate access to the configuration parameters $108_2$ of illumination product 300 by a control hub or gateway (e.g., appliance communications gateway $104_3$) over various communications channels (e.g., wired channel 346 and wireless channel 347, respectively). Other external components might comprise microcontrollers that apply certain operational logic (e.g., according to operation rules or policies) to the configuration parameters to determine certain operational settings based at least in part on certain operational conditions. As another example, an external component might merely be coupled to the illumination product 300 to capture a log of the product's operating history in a data storage area of the external component. An external component might also be a sensor to provide certain information to illumination product 300. In other cases, the external product might be a powerful computing system (e.g., 32-bit computing system).

Various combinations of external components can be coupled to a particular illumination product to adapt the product to a target operating environment. In some cases, the firmware of the processor (e.g., processor firmware 344) and/or the firmware of any of the external components (e.g., component firmware 354) can be manipulated (e.g., over wired channel 346 or wireless channel 347) to adapt an illumination product to a particular target operating environment.

The foregoing discussions include techniques for codifying configuration parameters into files for access by external components, which techniques are disclosed in further detail as follows.

Figure 4:
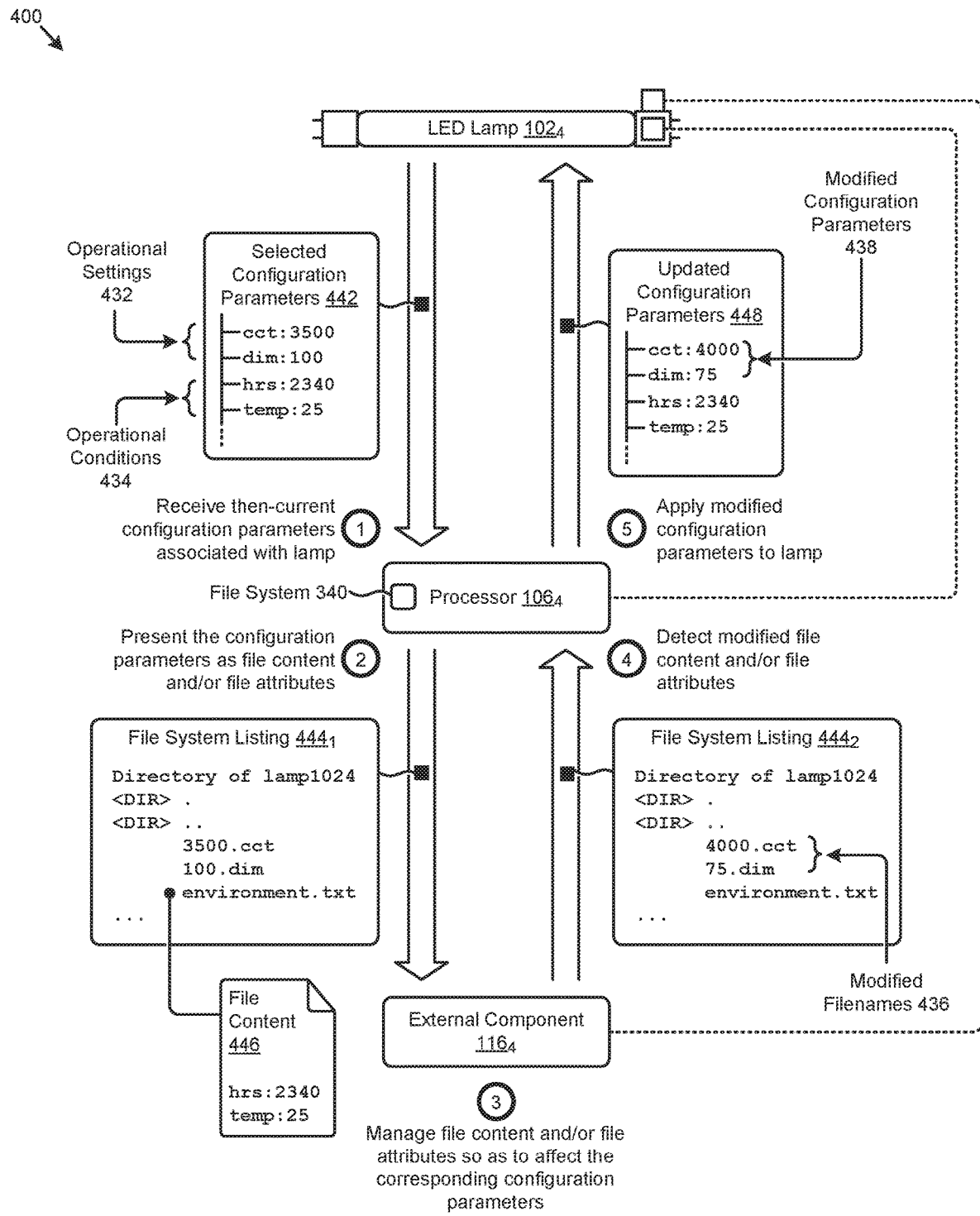
FIG. 4 illustrates a file access API usage scenario as implemented in systems that facilitate low-cost reconfiguration of illumination products, according to an embodiment.

FIG. 4 illustrates a file access API usage scenario 400 as implemented in systems that facilitate low-cost reconfiguration of illumination products. As an option, one or more variations of file access API usage scenario 400 or any aspect thereof may be implemented in the context of the architecture and functionality of the embodiments described herein. The file access API usage scenario 400 or any aspect thereof may be implemented in any environment.

FIG. 4 illustrates one aspect pertaining to implementing a device access framework that presents a file access API for access to an illumination product's configuration by external components. The figure is presented to illustrate one embodiment of a file access API that facilitates communication between an illumination product and one or more external components through manipulation of certain file attributes that correspond to configuration parameters of the illumination product.

As shown, FIG. 4 depicts an LED lamp $102_4$ that comprises a processor $106_4$ that is coupled with an external component $116_4$ to facilitate the herein disclosed techniques. A set of selected configuration parameters 442 associated with LED lamp $102_4$ are received by processor $106_4$ (operation 1). As can be observed, the selected configuration parameters 442 comprise key-value pairs that characterize a set of operational settings 432 and a set of operational conditions 434. Operational settings correspond to parameters that pertain to the operation of LED lamp $102_4$ that may be controlled, such as the color temperature (e.g., "cct: 3500") or the dimming percentage (e.g., "dim:100"). Operational conditions correspond to parameters that pertain to the environmental conditions of LED lamp $102_4$, but may not be controllable, such as the number of operational hours (e.g., "hrs:2340") or the then-current temperature (e.g., "temp: 25").

The then-current configuration parameters received at processor $106_4$ are presented as file content and/or file attributes according to a particular file system (e.g., file system 340) (operation 2). The shown file system listing $444_1$ depicts one example of how the selected configuration parameters 442 can be embedded in a set of file content and/or file attributes. As can be observed, the operational settings 432 are codified directly into the filenames (e.g., "3500.cct" and "100.dim") of the first two files shown in file system listing $444_1$. The operational conditions 434 are encoded in the file content 446 of file "environment.txt".

Since the file system 340 can be known, external component $116_4$ can be configured to be capable of managing the file content and/or file attributes at processor $106_4$ so as to affect the corresponding configuration parameters (operation 3). As illustrated in file system listing $444_2$, external component $116_4$ might modify the filenames (e.g., modified filenames 436) of the files corresponding to operational settings 432 so as to affect those settings for LED lamp $102_4$. The processor $106_4$ can detect such file content and/or file attribute changes (operation 4) and apply the corresponding modified configuration parameters to the lamp (operation 5). As such, upon any change an operating environment, or merely at election of a user or operator, the file contents and/or file attributes according to the particular file system can be modified at will. Example modifications can be observed in the shown set of updated configuration parameters 448. The modified configuration parameters 438 correspond to the modified filenames 436 which indicate that LED lamp $102_4$ is to operate at a color temperature of 4000K (e.g., "cct:4000") and at a dimming level of 75 percent (e.g., "dim:75").

The foregoing discussions include techniques for management (e.g., reading, writing, etc.) of configuration parameters by external components, which techniques are disclosed in further detail as follows.

Figure 5:
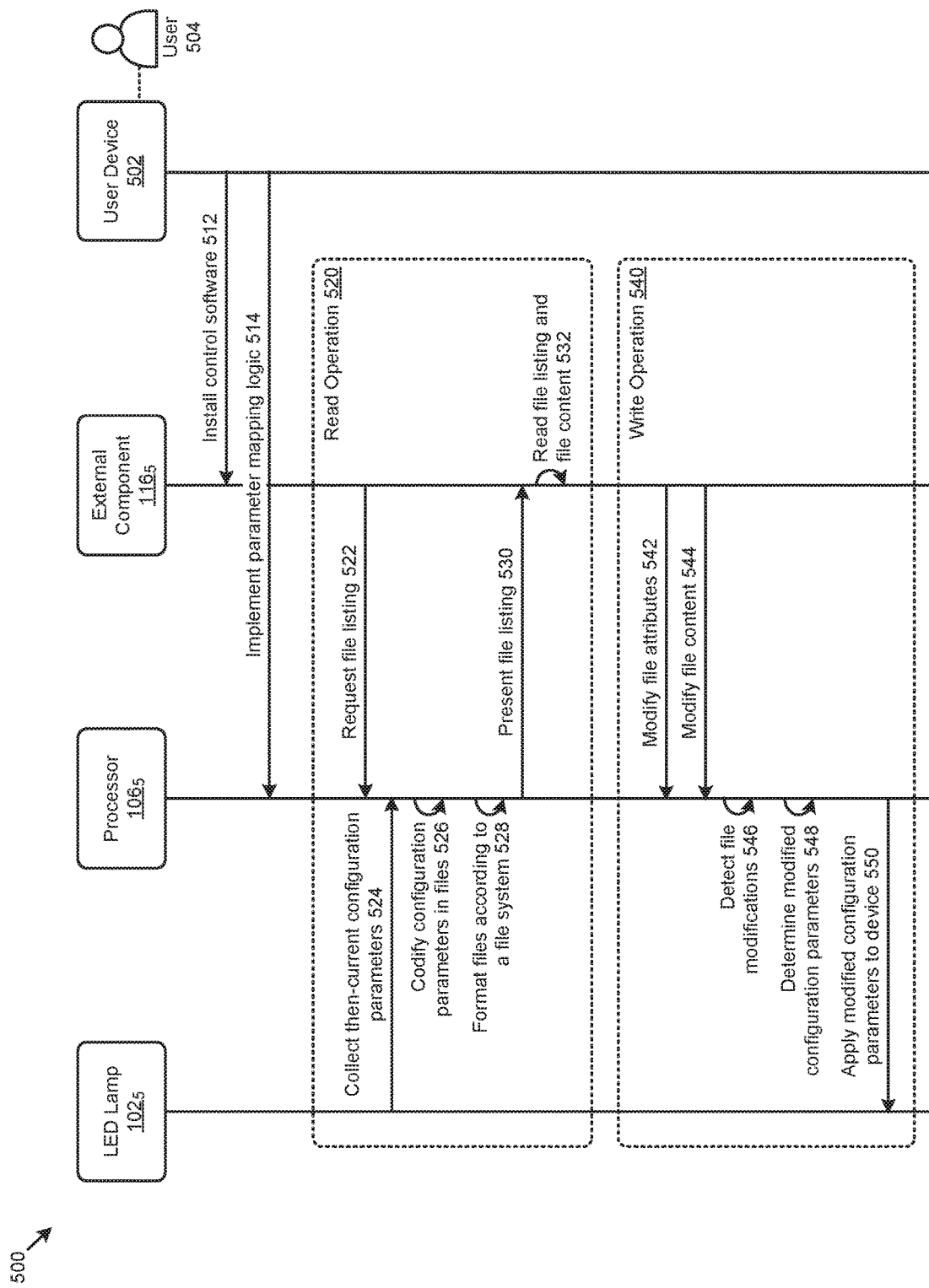
FIG. 5 depicts an illumination product access protocol as implemented in systems that facilitate low-cost reconfiguration of illumination products, according to an embodiment.

FIG. 5 depicts an illumination product access protocol 500 as implemented in systems that facilitate low-cost reconfiguration of illumination products. As an option, one or more variations of illumination product access protocol 500 or any aspect thereof may be implemented in the context of the architecture and functionality of the embodiments described herein. The illumination product access protocol 500 or any aspect thereof may be implemented in any environment.

FIG. 5 illustrates one aspect pertaining to implementing a device access framework that presents a file access API for access to an illumination product's configuration by external components. The figure is being presented to depict a protocol for management (e.g., reading, writing, etc.) of the configuration parameters associated with the illumination product by the external components, thereby facilitating management of the illumination product's configuration by the external components.

The illumination product access protocol 500 shown in FIG. 5 depicts a user device 502 associated with a user 504, and instances of other components earlier described that can exhibit a set of high order interactions (e.g., operations, messages, etc.) to facilitate such configuration management. Along with user device 502, an LED lamp $102_5$, a processor $106_5$, and an external component $116_5$ are also shown.

The illumination product access protocol 500 can commence with installing control software in external component $116_5$ (message 512). For example, an external component $116_5$ based on the Raspberry Pi architecture might have a broad selection of control software available to upload (e.g., to the component firmware) to perform various functions. As another example, external component $116_5$ might be an integrated circuit in which certain features and/or capabilities can be turned on or off by the control software (e.g., firmware) installed on the component. Certain parameter mapping logic and/or other programming instructions are implemented at processor $106_5$ (message 514). In some embodiments, such parameter mapping logic and/or other programming instructions might be implemented in the processor firmware during the manufacturing and/or initial programming of the processor. In certain embodiments, from time to time, one or more sets of programming instructions (e.g., as might be included in firmware updates) can be uploaded (e.g., through external component $116_3$) to processor $106_3$.

To facilitate a read of one or more configuration parameters associated with LED lamp $102_5$ (e.g., read operation 520), external component $116_5$ requests a file listing from processor $106_5$ (message 522). A set of then-current configuration parameters are collected (message 524) and codified in various files (operation 526) that are formatted according to a file system (operation 528). A file listing comprising the files is presented to the external component $116_5$ (message 530). In some cases, a message containing a formatted listing of the files might be presented to external component $116_5$. In other cases, a message containing a reference to a file allocation table (e.g., at a data storage facility at processor $106_5$) that describes the storage location of the files and their content might be presented to external component $116_5$. In any case, the external component $116_5$ can read the file listing and/or file content and the configuration parameters codified therein (operation 532) to complete the read operation 520.

To facilitate a write of one or more configuration parameters associated with LED lamp $102_5$ (e.g., write operation 540), external component $116_5$ modifies one or more of the file attributes (message 542) and/or the file content (message 544) of one or more of the files in the file listing earlier received. In some cases, external component $116_5$ might issue a message to processor $106_5$ containing the modifications while, in other cases, external component $116_5$ might write the modifications directly to a data storage facility at processor $106_5$. In any case, processor $106_5$ will detect the file modifications (operation 546) and determine the corresponding configuration parameter modifications (operation 548). The modified configuration parameters (e.g., operation settings) are then applied to LED lamp $102_5$ (message 550) to complete the write operation 540.

In certain embodiments, the illumination product access protocol 500 might be facilitated by a communications protocol such as the media transfer protocol (MTP). The MTP is an extension of the picture transfer protocol (PTP)

that facilitates access to files and file metadata (e.g., file attributes) at a host computer (e.g., processor $106_5$) by an external device (e.g., external component $116_5$). The MTP operates at a logical file level, thereby eliminating a need for block-level access to the host storage facility by the external device. This approach reduces or eliminates the potential of data corruption at the host storage facility. Furthermore, the MTP facilitates a variety of filesystems at the external device (e.g., external component $116_5$). In other embodiments, the illumination product access protocol 500 might be facilitated by the file transfer protocol (FTP). In this case, the operations (e.g., read file data, write file data, modify file attributes, etc.) associated with the illumination product access protocol 500 and/or other herein disclosed techniques can be performed over a variety of file systems that might implemented at the processor $106_5$ and/or the external component $116_5$.

Additional Embodiments of the Disclosure

Additional Practical Application Examples

Figure 6:
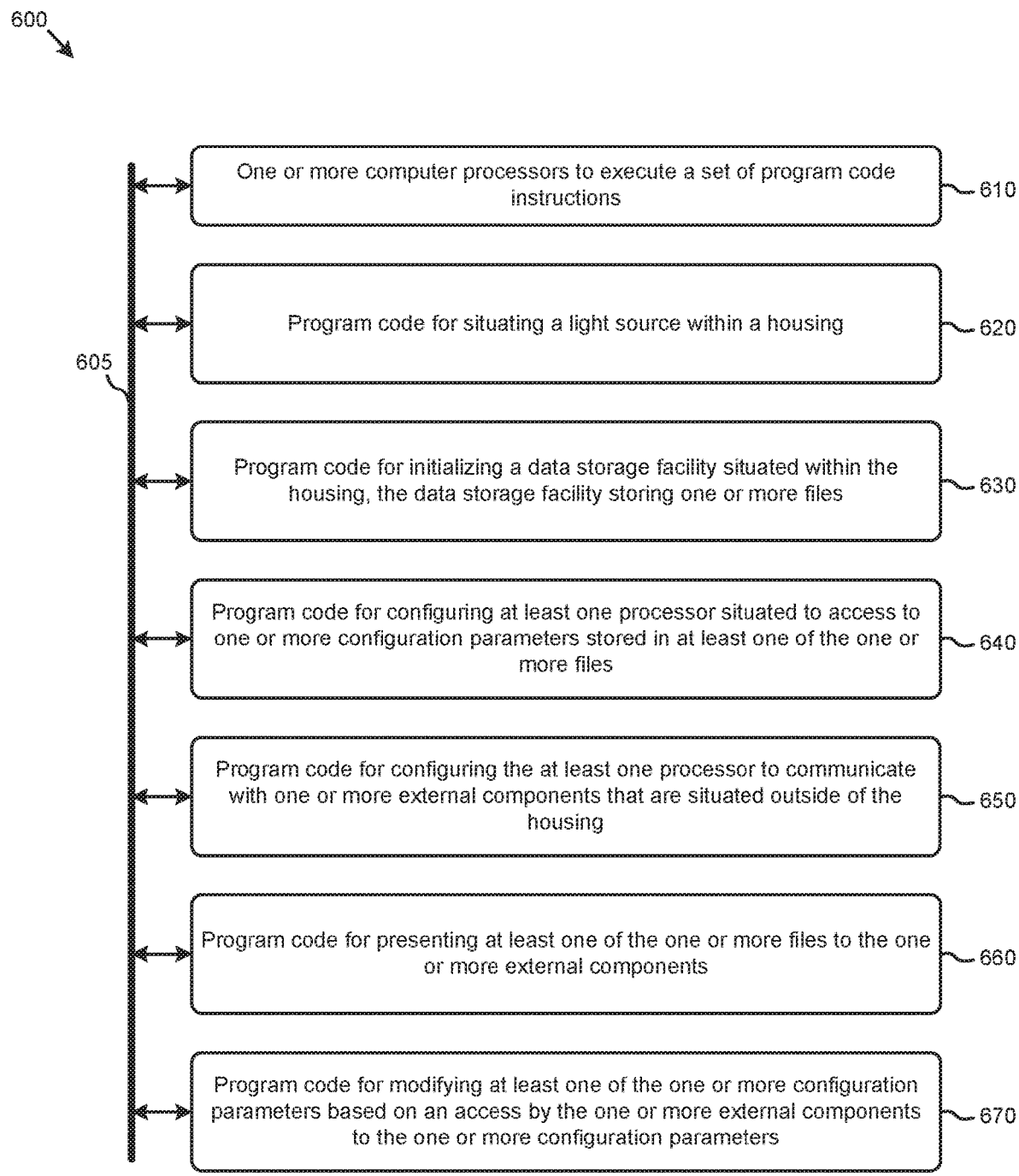
FIG. 6 depicts a manufacturing system 600 as an arrangement of computing modules that are interconnected so as to operate cooperatively to implement certain of the herein-disclosed embodiments.

FIG. 6 depicts a manufacturing system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address obsolescence of illumination products as changes occur in their operating environment. The partitioning of manufacturing system 600 is merely illustrative and other partitions are possible. The manufacturing system 600 or any operation therein may be carried out in any desired environment. The manufacturing system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within manufacturing system 600. Any operations performed within manufacturing system 600 may be performed in any order unless as may be specified in the claims. The shown embodiment implements a portion of a manufacturing system 600. The manufacturing system comprises a master computer processor to perform manufacturing steps by executing a set of program code instructions (module 610). The manufacturing system further comprises modules for accessing memory to hold program code instructions. The manufacturing steps include: situating a light source within a housing (module 620); initializing a data storage facility situated within the housing, the data storage facility storing one or more files (module 630); configuring at least one processor situated to access to one or more configuration parameters stored in at least one of the one or more files (module 640); configuring the at least one processor to communicate with one or more external components that are situated outside of the housing (module 650); and presenting at least one of the one or more files to the one or more external components (module 660). The manufacturing process may further comprise test phases that initialize and test the reconfigurable illumination product by modifying at least one of the one or more configuration parameters based on an access by the one or more external components to the one or more configuration parameters (module 670).

Variations of the foregoing may include more or fewer of the shown modules. Certain variations may perform more or fewer (or different) manufacturing steps and/or certain variations may use more or fewer (or different) modules to perform more or fewer (or different) operations.

System Architecture Overview

Additional System Architecture Examples

Figure 7A:
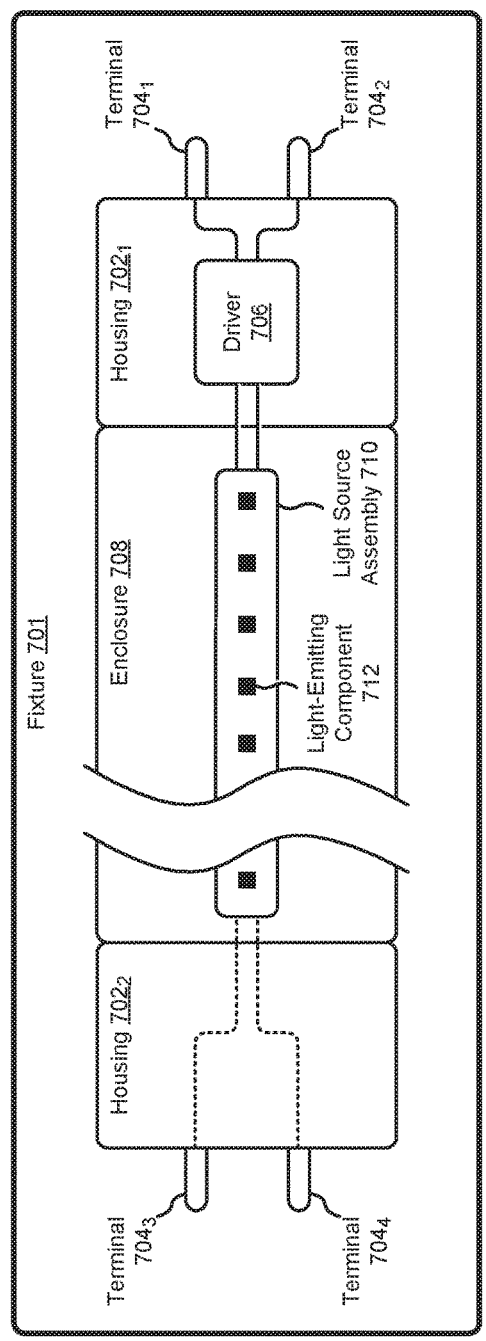
FIG. 7A presents a lamp that is suitable for use in conjunction with the disclosed embodiments and/or for use in the herein-described environments.

FIG. 7A presents an illumination product 7A00 that is suitable for use in conjunction with the disclosed embodiments and/or for use in the herein-described environments. The shown illumination product 7A00 comprises a fixture 701 that supports one or more of the components that make up the illumination product. The fixture 701 can take on any shape and can be formed of any combination of materials. In some cases, the fixture is a troffer or a "can" that is intended to be installed in a ceiling recess. In some cases, the fixture provides mount points for affixing the fixture to a wall or other rigid or semi-rigid structure. In some cases, the fixture provides a floor stand or floor mount so as to elevate portions of the illumination product above a floor.

The illumination product 7A00 further comprises a rigid or semi-rigid housing $702_1$ that supports a plurality of terminals (e.g., the terminals identified as terminal $704_1$ and terminal $704_2$). The plurality of terminals may support multiple functions such as to couple to a power source and/or to couple to a data source, and/or to serve as an anode and cathode. For example, terminal $704_1$ might function as an anode connected to the 'negative' side of a voltage source, and terminal $704_2$ might function as a cathode connected to the 'positive' side of a voltage source. The difference in potential between the anode and cathode can be employed with other features of the lamp. As one example, the anode and cathode are connected to a filament light source to emit incandescent light. As another example, the anode and cathode, specifically the difference in voltage potential between the two, are employed with certain gasses (e.g., argon or neon) to emit light (e.g., based on photon emissions after excitation). As another example, the terminals are connected to a light-emitting diode serving as a light source to emit light due to spontaneous emission of photons. As another example, the terminals are connected to a lasing device serving as a light source to emit light from stimulated emission of radiation. The voltage potential between two terminals can be used to couple power at the same time as being used to communicate data to or from other electrical devices. Specifically, in the shown embodiment, the terminals are coupled to a driver 706 that is situated in rigid or semi-rigid housing $702_1$. The terminals deliver power and data to driver 706 to facilitate control of light source assembly 710 by driver 706.

As shown, light source assembly 710 comprises one or more light-emitting components 712 (e.g., LEDs) that provide the light. An enclosure 708 protects the light source assembly 710 while also emitting and/or directing some or all of the light produced by the light source assembly 710. In some cases, the enclosure 708 facilitates the production of light. For example, in a fluorescent lamp, an enclosure might be coated with phosphors that emit visible light when the phosphors are excited by short-wave ultraviolet light produced within the enclosure.

In the embodiment shown, illumination product 7A00 comprises a second housing (e.g., housing $702_2$) that supports a second set of terminals (e.g., terminal $704_3$ and terminal $704_4$). Such an embodiment might represent a LED tube lamp designed to replace a fluorescent lamp. In some cases, terminal $704_3$ and terminal $704_4$ are not electrically connected to a voltage potential and, instead, merely provide structural support for holding the lamp in its fixture. In other cases, terminal $704_3$ and terminal $704_4$ might be electrically connected to the lamp to provide power and/or data to light source assembly 710 and/or driver 706.

Figure 7B:
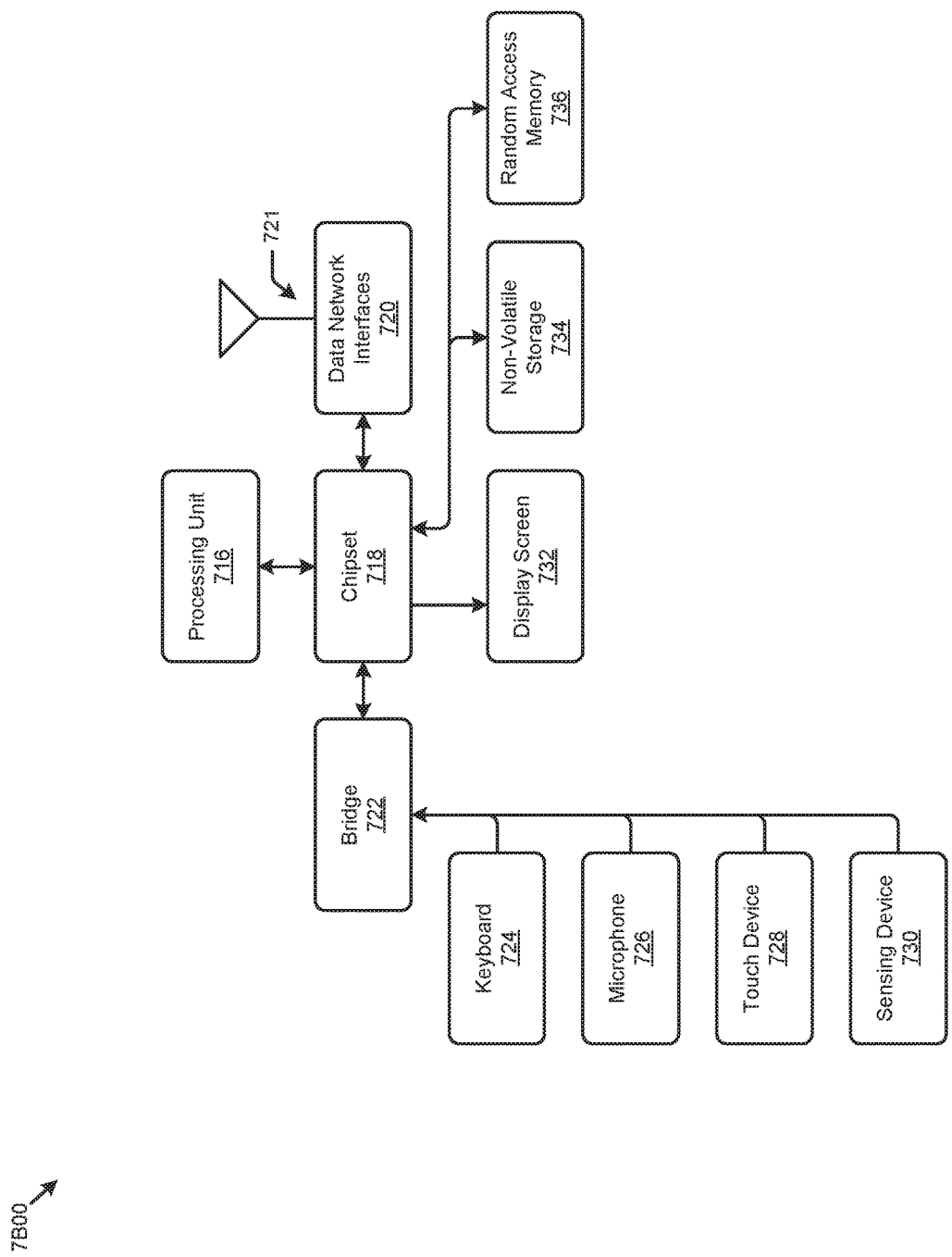
FIG. 7B depicts an interconnection of electronic components to form a system suitable for use with embodiments of the present disclosure and/or for use in the herein-described environments.

FIG. 7B depicts an interconnection of electronic components to form a system 7B00 suitable for use with embodiments of the present disclosure and/or for use in the herein-described environments. Examples of such components include a display, user input structures, input/output connectors, and/or other elements associated with the electronic components.

The display of the electronic component may be a liquid crystal display (LCD), a light-emitting diode (LED) based display, an organic light-emitting diode (OLED) based display, or some other suitable display. The display may present a user interface comprising various other elements (e.g., buttons, links, visual content, etc.) with which a user can interact. Additionally, in certain embodiments, a display may include a touch screen through which a user may interact with the user interface. The display may also include various functions and/or system indicators to provide feedback to a user such as power status, call status, memory status, or the like. These indicators may be incorporated into the user interface presented on the display.

In certain embodiments, one or more user input structures associated with the electronic component can be configured to control the device such as by controlling a mode of operation, an output level, an output type, etc. For instance, the user input structures may include a button to turn the device on or off. Further, the user input structures may allow a user to interact with the user interface on the display. Embodiments of the portable electronic component may include any number of user input structures including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

Certain electronic components may also include various input and output ports to allow connection of additional devices. For example, a port may be a headphone jack that provides for the connection of headphones. Additionally, a port may have both input and output capabilities to provide for the connection of a headset (e.g., a headphone and microphone combination). Embodiments of the electronic component may include any number of input and/or output ports such as headphone and headset jacks, universal serial bus (USB) ports, IEEE-1394 ports, and AC and/or DC power connectors. Further, a device may use the input and output ports to connect to, and send or receive data with, any other device such as other portable electronic components, personal computers, printers, or the like. For example, in one embodiment, the device may connect to a personal computer via an IEEE-1394 connection to send and receive data files such as media files.

The components of system 7B00 includes computer hardware, software, and firmware that can be used to implement the disclosures above. Specifically, the shown system includes a processing unit 716, which is representative of any number of physically and/or logically distinct resources capable of executing software, firmware, and hardware configured to perform identified computations. The processing unit 716 communicates with a chipset 718 that can control input to and output from processing unit 716. In this example, chipset 718 outputs information to display screen 732 and can read and write information to non-volatile storage 734, which can include magnetic media and solid-state media and/or other non-transitory media, for example. Chipset 718 can also read data from and write data to random access memory 736 (RAM). A bridge 722 for interfacing with a variety of user interface components can be provided for interfacing with chipset 718. Such user interface components can include a keyboard 724, a microphone 726, touch-detection-and-processing circuitry (e.g., touch device 728), a sensing device 730 (e.g., a biometric sensor, an image sensor, etc.), and so on. In general, inputs to the system can come from any of a variety of machine-generated and/or human-generated sources.

Chipset 718 also can interface with one or more data network interfaces 720 that can have different physical interfaces. The data network interfaces 720 can include interfaces for wired and wireless local area networks, for broadband wireless networks, as well as personal area networks. Some applications of the methods for generating, displaying and using the GUI disclosed herein can include receiving data over a physical interface 721 and/or by receiving data generated by the device itself, and/or by accessing data stored in non-volatile storage 734 and/or by accessing data stored in memory or random access memory 736. Further, the electronic component can receive inputs from a user via devices such as a keyboard 724, microphone 726, touch-detection-and-processing circuitry (e.g., touch device 728), and/or via sensing device 730. The user can thus control certain capabilities such as browsing and/or input/output functions.

Figure 7C:
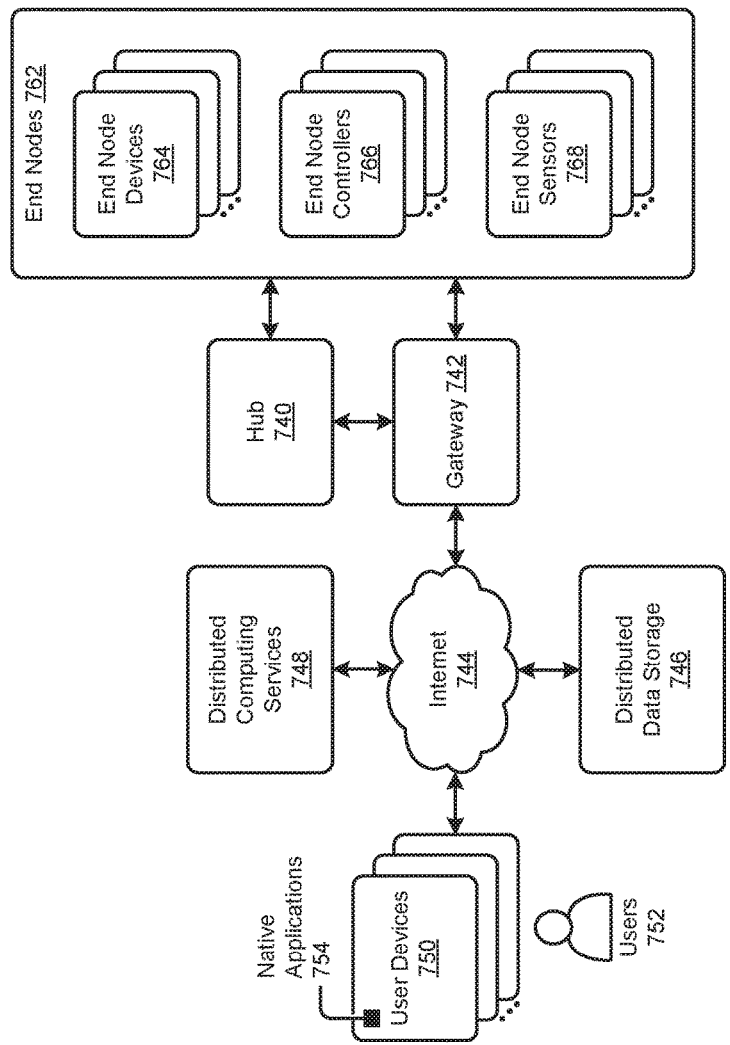
FIG. 7C presents a block diagram of a system having components suitable for implementing embodiments of the present disclosure and/or for use in the herein-described environments.

FIG. 7C presents a block diagram of a system architecture 7C00 having components suitable for implementing embodiments of the present disclosure and/or for use in the herein-described environments. Such a computer system architecture facilitates communications between any of a set of end nodes 762 (e.g., end node devices 764, end node controllers 766, end node sensors 768, etc.) and the Internet 744 and/or to other end nodes. The system architecture 7C00 might represent an Internet-of-Things (IoT) implementation, an Industrial Internet-of-Things (IIoT) implementation, or a smart home implementation. In any of the foregoing implementations, any one or more of the end node devices 764 might comprise one or more appliances, such as an illumination product.

As can be observed, a hub 740 and/or a gateway 742 can facilitate communications between the end nodes 762. The gateway 742 connects the end nodes 762 to the Internet 744. The information from end nodes 762 available at the Internet 744 can be stored at various instances of distributed data storage 746 (e.g., cloud storage) and/or processed by various instances of distributed computing services 748 (e.g., cloud services). One or more users 752 can manage the information from the end nodes 762 and/or produced by the distributed computing services 748 using one or more user devices 750 that have access to the Internet 744. Certain native applications (e.g., native applications 754) operating at the user devices 750 can facilitate such information management. For example, an application provided by a "smart appliance" manufacturer might facilitate control over certain appliances (e.g., turning a lamp on/off, dimming a lamp, etc.) from a user device (e.g., smart phone). As another example, the manufacturer of hub 740 might offer an application for a user device to control any of the end nodes from end nodes 762 that are connected to hub 740.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A lamp comprising:
    at least one light source mechanically connected to a housing;
    at least one data storage facility situated within the housing, the at least one data storage facility storing one or more files; and
    at least one processor situated in the housing, the at least one processor having access to one or more configuration parameters stored in the one or more files, wherein the one or more files are codified with one or more configuration parameters that include modifiable key-value pairs that characterize a set of operational settings that correspond to parameters that pertain to an operation of the lamp and key-value pairs that characterize a set of operational conditions that correspond to parameters that pertain to environmental conditions of the lamp, wherein the at least one processor configured to communicate with one or more external components that are situated outside of the housing,
    wherein the at least one processor presents the one or more files to the one or more external components to facilitate access by the one or more external components to the one or more configuration parameters.

2. The lamp of claim 1, wherein the one or more files are organized as a file system in the at least one data storage facility.

3. The lamp of claim 1, wherein at least one of the one or more configuration parameters corresponds to at least one of, an operational setting of the lamp, or an operational condition of the lamp.

4. The lamp of claim 1, wherein at least one of the one or more configuration parameters is derived from one or more sensor readings.

5. The lamp of claim 1, wherein at least one of the one or more configuration parameters are codified in at least one of, a file attribute, or a set of file content, associated with the one or more files.

6. The lamp of claim 5, wherein at least one of the one or more external components modifies the file attribute to effect a change to the at least one of the one or more configuration parameters.

7. The lamp of claim 6, wherein the file attribute is modified in response to at least one change to an operating environment.

8. The lamp of claim 1, further comprising at least one physical connector to couple at least one of the one or more external components to the at least one processor.

9. The lamp of claim 1, further comprising at least one physical connector to couple a first external component from the one or more external components to a second external component from the one or more external components.

10. The lamp of claim 1, further comprising at least one driver and at least one light source, wherein the at least one driver controls the at least one light source based at least in part on at least one of the one or more configuration parameters.

11. The lamp of claim 10, wherein the at least one light source comprises one or more LEDs.

12. The lamp of claim 1, wherein at least one of, the at least one processor, or at least one of the one or more external components, comprise a set of firmware.

13. The lamp of claim 12, wherein the set of firmware is uploaded to at least one of, the at least one processor, or at least one of the one or more external components.

14. The lamp of claim 1, wherein the at least one processor and the at least one data storage facility are implemented in an integrated circuit.

15. The lamp of claim 1, wherein at least one of the one or more external components comprises at least one of, a transceiver, a microcontroller, a sensor, a computing system, or a data storage area.

16. A method of manufacturing a lamp comprising:
    providing at least one light source mechanically connected to a housing;
    providing at least one data storage facility situated within the housing, the at least one data storage facility storing one or more files; and
    providing at least one processor situated in the housing, the at least one processor having access to one or more configuration parameters stored in the one or more files, wherein the one or more files are codified with one or more configuration parameters that include modifiable key-value pairs that characterize a set of operational settings that correspond to parameters that pertain to an operation of the lamp and key-value pairs that characterize a set of operational conditions that correspond to parameters that pertain to environmental conditions of the lamp, wherein the at least one processor configured to communicate with one or more external components that are situated outside of the housing,
    wherein the at least one processor presents the one or more files to the one or more external components to facilitate access by the one or more external components to the one or more configuration parameters.

17. The method of claim 16, wherein the one or more files are organized as a file system in the at least one data storage facility.

18. The method of claim 16, further comprising providing at least one physical connector to couple at least one of the one or more external components to the at least one processor.

19. The method of claim 16, further comprising providing at least one physical connector to couple a first external component from the one or more external components to a second external component from the one or more external components.

20. The method of claim 16, further comprising providing at least one driver and at least one light source, wherein the at least one driver controls the at least one light source based at least in part on at least one of the one or more configuration parameters.

* * * * *